United States Patent [19]

Oh

[11] Patent Number: 5,503,743

[45] Date of Patent: Apr. 2, 1996

[54] DEVICE FOR DEHYDRATING SLUDGE WASTE

[76] Inventor: Hong S. Oh, 439-5, Sinkok 5 ri, Kochon-myun, Kimpo-kun, Kyung ki-do, Rep. of Korea

[21] Appl. No.: 60,006

[22] Filed: May 12, 1993

[30] Foreign Application Priority Data

Mar. 13, 1993 [KR] Rep. of Korea ............... 3844/1993

[51] Int. Cl.⁶ .................................................. B01D 33/04
[52] U.S. Cl. ................... 210/248; 210/261; 210/262; 210/335; 210/400; 210/413; 210/770
[58] Field of Search ................... 210/261, 262, 210/335, 770, 400, 413, 248

[56] References Cited

U.S. PATENT DOCUMENTS

| | | | |
|---|---|---|---|
| 1,211,947 | 1/1917 | Kiefer | 210/335 |
| 2,516,968 | 8/1950 | Faler | 210/400 |
| 3,968,040 | 7/1976 | Ostrop | 210/400 |
| 4,066,548 | 1/1978 | Olson et al. | 210/350 |
| 4,186,098 | 1/1980 | Morris | 210/400 |
| 4,851,132 | 7/1989 | Di Leo | 210/770 |
| 4,915,850 | 4/1990 | Onnes | 210/400 |
| 4,997,578 | 3/1991 | Berggren | 210/770 |
| 5,160,440 | 11/1992 | Mérai | 210/770 |
| 5,205,941 | 4/1993 | Funk et al. | 210/770 |
| 5,292,434 | 3/1994 | Benesi | 210/770 |

FOREIGN PATENT DOCUMENTS

| | | | |
|---|---|---|---|
| 0164482 | 12/1985 | European Pat. Off. | 210/400 |
| 4166294 | 6/1992 | Japan | 210/335 |

*Primary Examiner*—Virginia Manoharan
*Attorney, Agent, or Firm*—Bidyut K. Niyogi

[57] ABSTRACT

A compact sludge dehydrating apparatus having a replaceable upper part, with a lower part, a replaceable upper part having a sludge inlet, a plurality of columns for detachably mounting the upper part to the lower part with a space, a first sludge dehydrator for performing a first dehydration of the sludge waste and being provided in the upper part, a second sludge dehydrator for performing a second dehydration of the sludge waste and being mounted on the lower part. This second dehydrator communicates with the first dehydrator through a pipe. The first and the second cases are interconnected. A plurality of drains is provided to drain the waste waters extruded from the sludge waste as a result of sludge dehydration to a water collection tank of the lower part. The apparatus provides, for the upper part being replaceable for different kinds of the wastes to be treated, which reduces the moisture content of the resulting sludge waste.

14 Claims, 10 Drawing Sheets

5,503,743

DEVICE FOR DEHYDRATING SLUDGE WASTE

BACKGROUND OF THE INVENTION

1. Field of the Invention

The present invention relates in general to dehydration of micro particular sludge waste discharged from industrial plants, such as a water treatment plant, a paper mill, a food manufactory and a chemical plant, and more particularly to a compact sludge dehydrating device which can be changed in a part of its elements, particularly its upper part, in line with kinds of the wastes to be treated and, as a result, has a good compatibility, and remarkably reduces the moisture content of the resulting sludge waste.

2. Description of the Prior Art

There have been proposed several types of sludge waste dehydrating devices, such as a roller belt type device, a heating type device, a conventional compressing type device including a screw compressing type device. However, each of these known devices has a complex construction and a relatively larger scale so that its operation requires much energy, resulting in economical problem. Furthermore, these known devices cause capillarity of the resulting sludge waste since the sludge wastes before and after the compression dehydration are continuously fed in rapid succession. Such a capillarity causes the compressed and dehydrated sludge waste to absorb the moisture of the waste before the dehydration and this reduces the dehydration efficiency.

In this regard, such known dehydrating devices have a problem in that they can not easily economically dehydrate the sludge waste.

SUMMARY OF THE INVENTION

It is, therefore, an object of the present invention to provide a device for dehydrating sludge waste in which the aforementioned problem can be overcome and which causes no capillarity of the sludge under the compression, thereby reducing the moisture content of the resulting sludge waste to an extent of about 40% without using additional heat drying means, and which has a relatively simple construction and compact size as well as excellent dehydrating efficiency and minimizes operational energy consumption, and provides a good compatibility as a result of easy change of a part of its elements, particularly its upper part, in line with kinds of sludge wastes to be treated.

In accordance with an embodiment of the present invention, the aforementioned object can be overcome by providing a device for dehydrating sludge waste comprising: a lower part; a replaceable upper part having a sludge inlet, said upper part being detachably mounted on the lower part to be spaced apart from the lower part by a predetermined height; a plurality of columns for detachably mounting the upper part on the lower part with a predetermined space; first sludge dehydrating means for performing a first dehydration of the sludge waste, said first means being provided in the upper part; second sludge dehydrating means for performing a second dehydration of the sludge waste, said second means being mounted on the lower part and communicating with the first means through a pipe, and comprising first and second cases being connected to each other; and a plurality of drains for draining the waste waters extruded from the sludge waste as a result of sludge dehydrations to a water collection tank.

The sludge dehydrating device of this invention further includes third sludge dehydrating means for performing, in accordance with kinds of sludge waste to be treated, an additional dehydration of the sludge waste to be fed to the second case of the second sludge dehydrating means. This third means is interposed between the first and second cases of the second dehydrating means.

BRIEF DESCRIPTION OF THE DRAWINGS

The above and other objects, features and other advantages of the present invention will be more clearly understood from the following detailed description taken in conjunction with the accompanying drawings, in which:

FIGS. 3A to 3D are views showing embodiments of the present invention, relatively, in which:

FIGS. 3A and 3B are exploded perspective views of the embodiments of FIGS. 1 and 2 with their upper parts separated from the lower parts, respectively;

FIG. 3C is a sectional view of a first cylindrical case of second dehydrating means of the embodiments of FIGS. 3A and 3B; and FIG. 3D is a sectional view of a second cylindrical case of the second dehydrating means the embodiments of FIGS. 3A and 3B;

FIGS. 6A to 6E are views of the second dehydrating means engaging with third dehydrating means of the present invention, respectively, in which:

FIG. 6A is a sectional view when a conventional roller is employed;

FIG. 6B is a sectional view when a specifically designed spool roller is employed;

FIG. 6C is a view corresponding to FIG. 6B, but showing another embodiment of the present invention provided with an additional screw conveyor;

FIG. 6D is an exploded perspective view of the third dehydrating means of the present invention; and FIG. 6E is an exploded perspective view of one of the spool rollers of the third dehydrating means of FIGS. 6B and 6C;

DETAILED DESCRIPTION OF THE PREFERRED EMBODIMENTS

Figure 1:
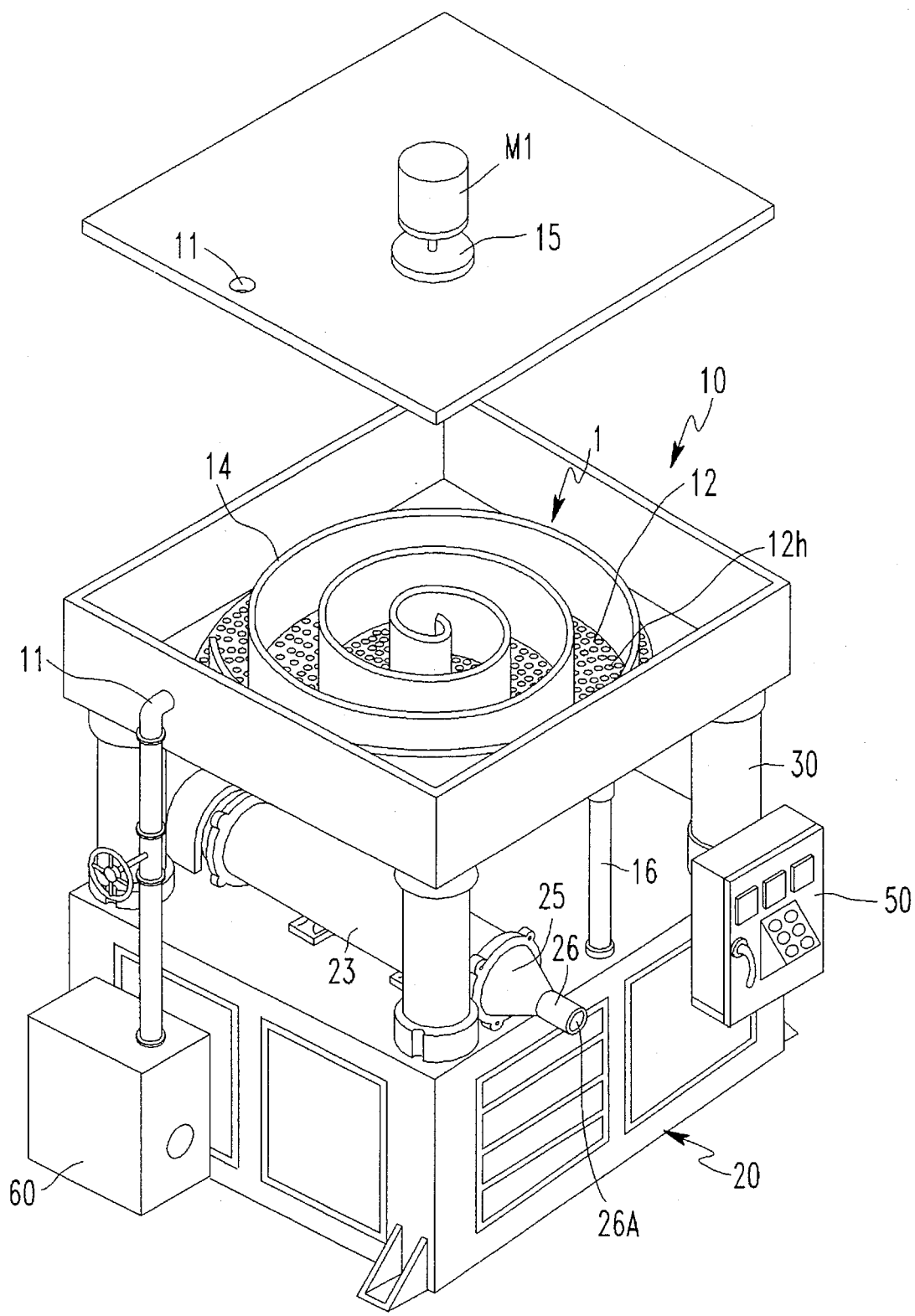
FIG. 1 is an exploded perspective view of an embodiment of a sludge waste dehydrating device of the present invention, showing the lid separated from the upper part.
Figure 2:
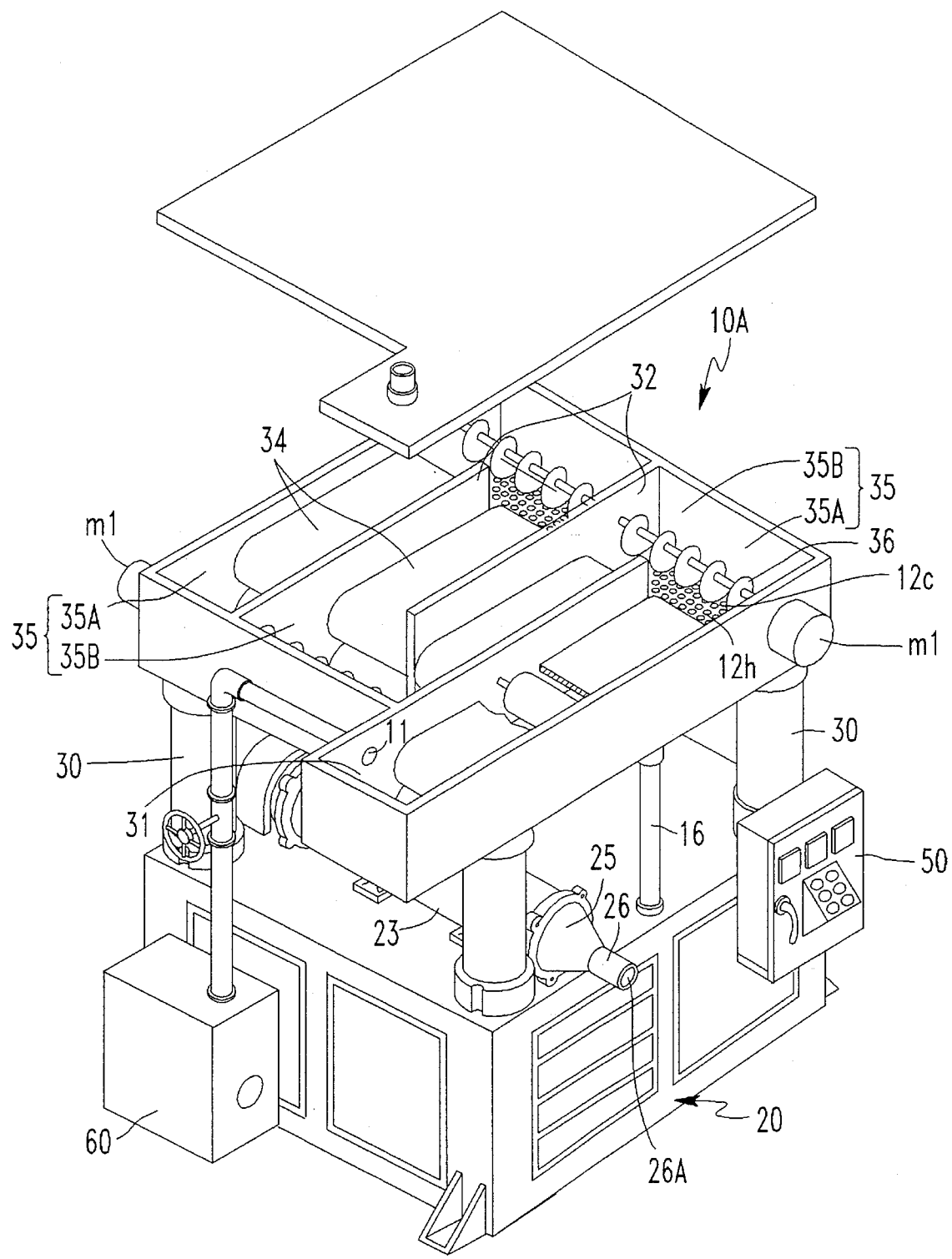
FIG. 2 is a view corresponding to FIG. 1, but showing a second embodiment of the present invention.
Figure 3A:
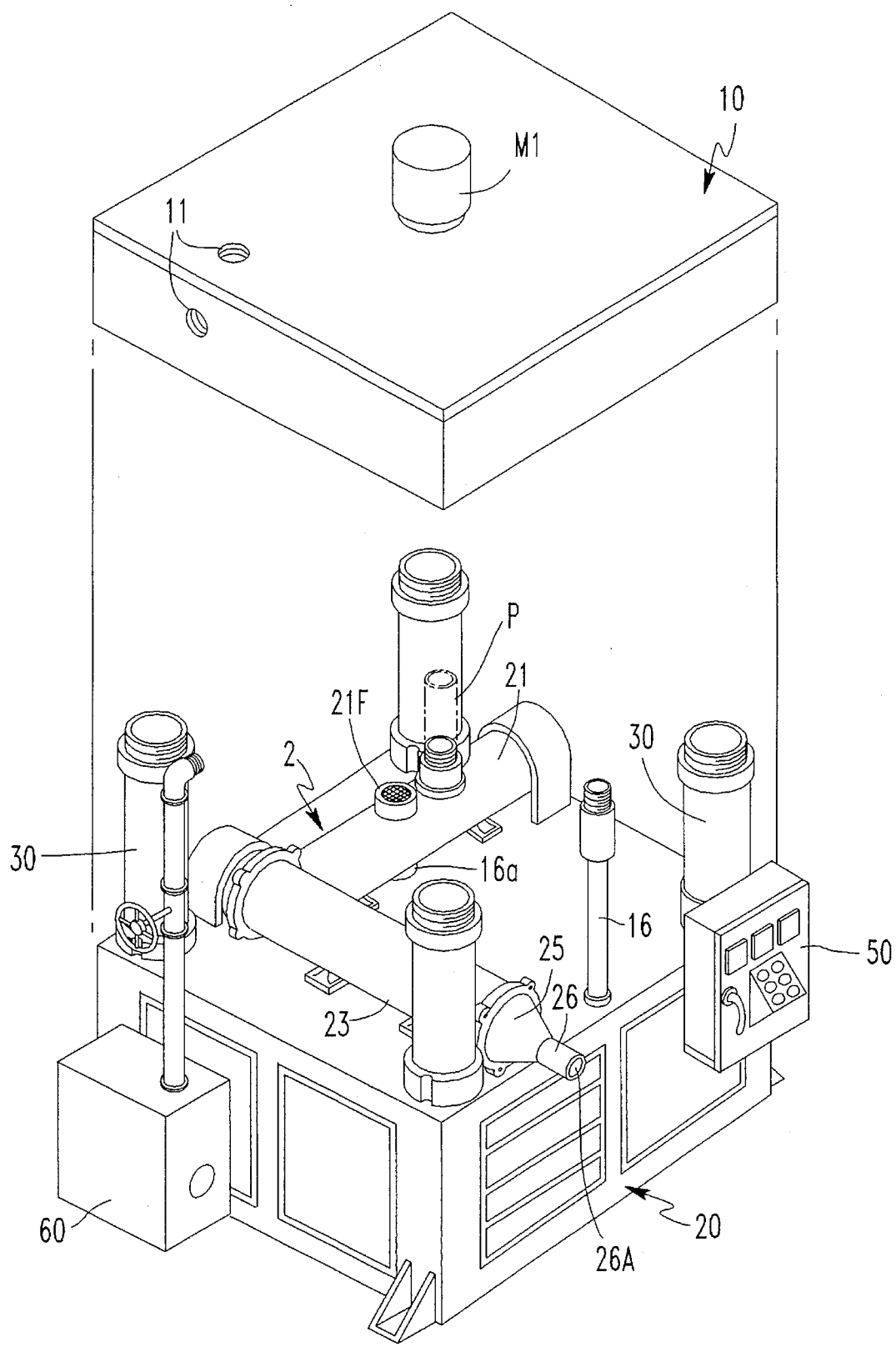
Figure 5:
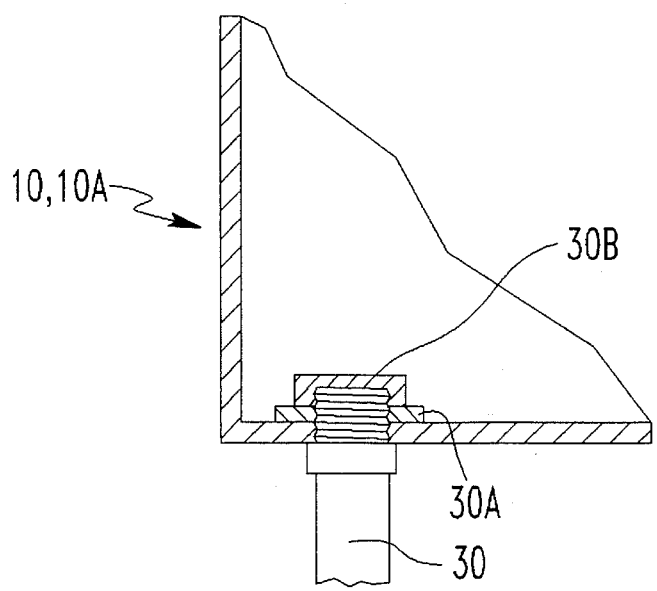
FIG. 5 is a detailed portion sectional view showing the engagement between the upper part and one column for detachably mounting the upper part on the lower part of the sludge waste dehydrating device of the present invention.
Figure 10:
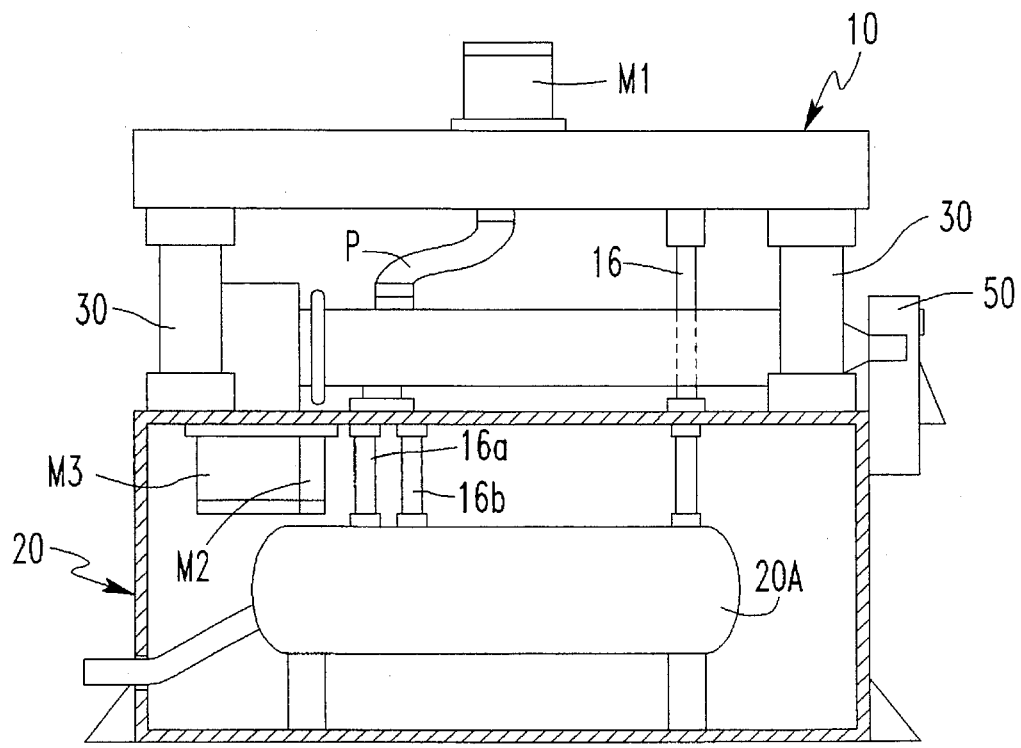
FIG. 10 is a partial sectional view of the lower part of the sludge waste dehydrating device of the present invention, showing the inner construction of the lower part.

With reference to FIGS. 1, 2 and 3A, there are shown embodiments of a sludge waste dehydrating device according to the present invention. As shown in these drawings, this waste dehydrating device generally comprises two parts, that is, a replaceable upper part 10 and a lower part 20. Here, the replaceable upper part 10 is supported by four columns 30, which are vertically mounted on the four corners of the lower part 20, respectively, such that it is spaced apart from the lower part 20 by a predetermined height. Here, it is very important that this upper part 10 should be brought into detachable engagement with the lower part 20. In order to achieve such a detachable engagement between the two parts 10 and 20, each of the columns 30 is screwed, as best seen in FIG. 5, to each corner of the square bottom surface of the upper part 10 such that its upper end upwardly protrudes from said bottom surface. The protruding upper end of this column 30 is detachably but tightly engages with a nut 30B with a packing 30A interposed between the nut 30B and the bottom surface of the upper part 10. As best seen in FIG. 10, the lower part 20 of this device is equipped with two drive motors $M_2$ and $M_3$ and a central water collection tank 20A. This collection tank 20A is connected to a plurality of waste water drains 16, 16a and 16b which introduce the waste waters extruded from the sludge waste as a result of dehydration processes performed by three sludge dehydration means, which will be described hereinbelow, to the tank 20A.

In order to achieve the dehydration of the sludge waste, the present dehydrating device includes the upper part 10 which is detachably mounted on the columns 30 and provided with first dehydrating means 1. This device also includes second dehydrating means 2 provided on the lower part 20 and third dehydrating means 4 which is connected to the second dehydrating means 2. This third means 4 is selectively connected to the second means 2 to cooperate with this means 2 in accordance with kinds of wastes to be treated.

Figure 4A:
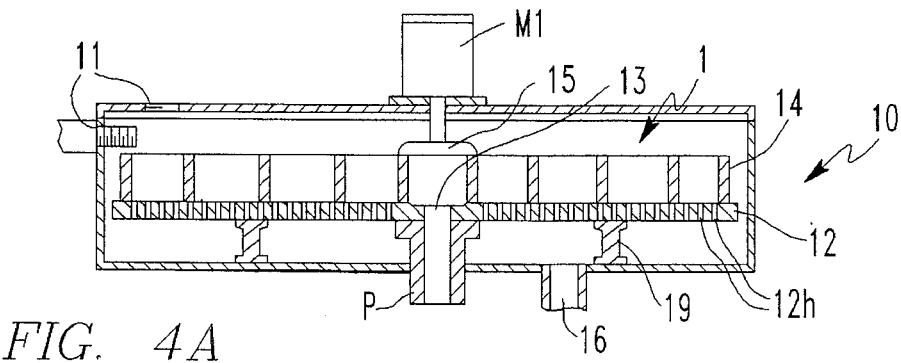
FIG. 4A is a sectional view of the upper part of the embodiment of FIG. 1.

As best seen in FIGS. 1, 3A and 4A, the box-shaped cabinet of the upper part 10 is provided with a sludge inlet 11 at the side surface or the upper surface thereof. In this cabinet, a perforated bottom plate 12 is laterally arranged to be spaced apart from the bottom surface of the cabinet. This perforated bottom plate 12 closely has a plurality of small apertures 12h and a central opening 13. This central opening 13 is connected to a pipe P which in turn downwardly extends to penetrate the bottom of the upper part 10. A spiral sludge guider 14 having a predetermined height is laid on the bottom plate 12 such that it comes into smooth contact with the perforated bottom plate 12 and rotates about the central opening 13 of the plate 12. This guider 14 is fixed, at its central upper end, to a shaft disc 15 of a first drive motor $M_1$ provided on the center of the lid of the upper part 10. This guider 14 constitutes, in cooperation with the perforated bottom plate 12 and the first drive motor $M_1$, the first dehydrating means 1.

The bottom of the cabinet under the perforated bottom plate 12 is also provided with the drain 16 which in turn extends to the central water collection tank 20A of the lower part 20. Hence, the extruded waste water of the first dehydrating means 1 drains to the tank 20A through this drain 16. The resulting sludge waste after the first dehydration of the first dehydrating means 1 is, thereafter, discharged to the lower part 20 through the central opening 13 of the bottom plate 12 and the pipe P and received by the second dehydrating means 2 which will be described later herein.

In accordance with this invention, it is possible to change the upper part including the first dehydrating means with another in accordance with kinds of sludge waste to be treated. In order to accomplish this object, the construction of the first dehydrating means is altered.

Figure 4B:
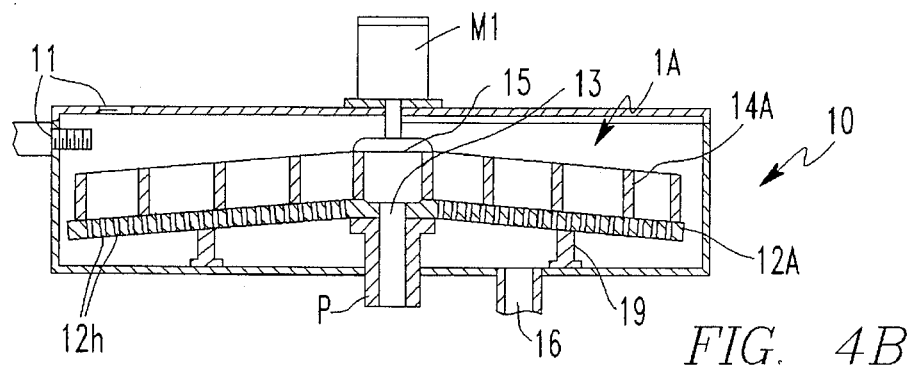
FIGS. 4B and 4C are views corresponding to FIG. 4A, but showing other embodiments of the upper part of the present invention.

With reference to FIG. 4B showing first dehydrating means 1A according to a second embodiment of this invention, this means 1A has a bottom plate 12A which is constructed to be upwardly inclined from the Outside to the center. In this second embodiment, the sludge guider 14A is upwardly inclined to the center so as to closely correspond to the inclined profile of the bottom plate 12A.

Figure 4C:
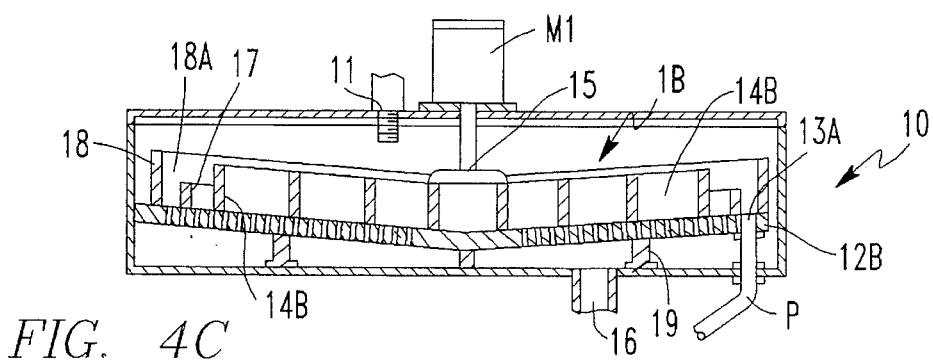

FIG. 4C shows first dehydrating means 1B according to third embodiment of this invention. In this embodiment, the bottom plate 12B, having no central opening 13, is downwardly inclined from the outside to the center oppositely to the above second embodiment. In order to correspond to the downward inclined profile of this bottom plate 12B, the sludge guider 14B is downwardly inclined to the center. In this case, the sludge inlet 11 is connected to the lid of the upper part 10 about its center. A first cylindrical wall 17, having an inner diameter larger than the radius of gyration of the spiral sludge guider 14B as well as a height lower than that of the guider 14B, is provided on the bottom plate 12B to surround the guider 14B. This first cylindrical wall 17 is in turn surrounded by a rotary cylindrical wall 18, or a second cylindrical wall, which is disposed on the bottom plate 12B to be spaced apart from the first wall 17 by a predetermined annular interval and has a height higher than that of the guider 14B. This dehydrating means 1B also has a guide member 18A at a predetermined position inside of the second wall 18. In this third embodiment, the pipe P for discharging the dehydrated sludge waste of the first dehydrating means 1B is connected to an opening 13A provided at a position of the bottom plate 12B between the first and second cylindrical walls 17 and 18.

Figure 8:
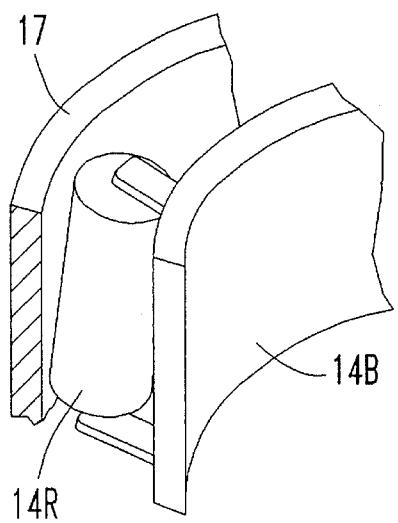
FIG. 8 is a partial perspective view of the spiral sludge guider of FIG. 4D equipped with a slant roller.

Here, a roller 14R is preferably provided at an outer distal end of the spiral guider 14B to come into contact with the inner surface of the first cylindrical wall 17 as best seen in FIG. 8. Also, it is preferred to mount this roller 14R on the guider 14B to be inclined with the vertical axis of the upper part. In this case, this roller 14R is named as the slant roller. Such an inclination of this slant roller 14R promotes upward movement of the sludge waste.

The second cylindrical wall 18 is rotated by means of a drive motor of which output power is transmitted to the wall 18 through a power transmission mechanism which are provided in the cabinet of the upper part 10. This power transmission mechanism can be conventionally provided in the part 10 and is thus not deemed necessary and not shown in the drawings.

Figure 7:
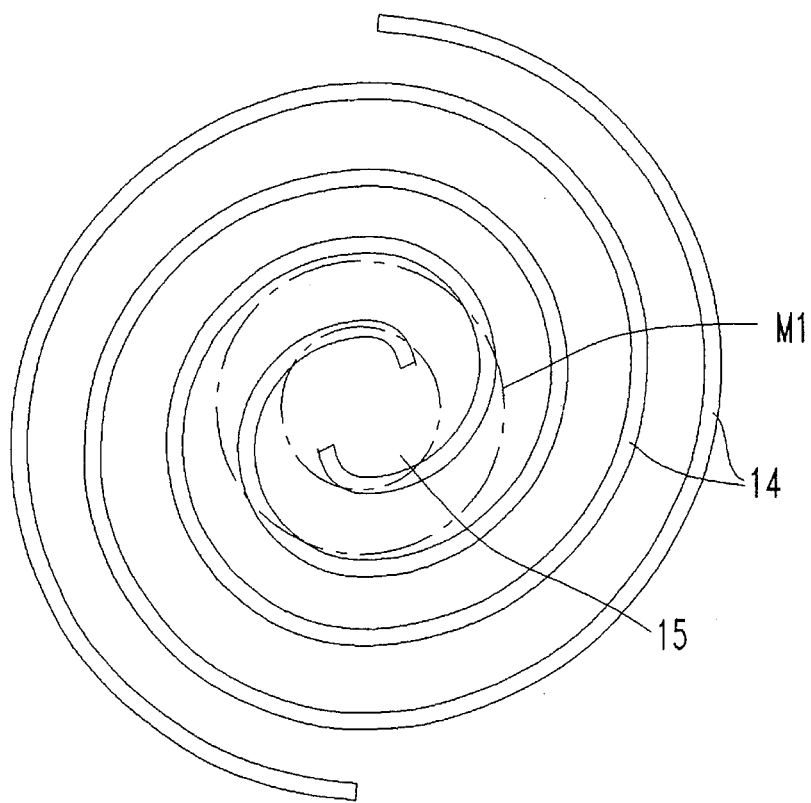
FIG. 7 is a plan view of a spiral sludge guide part of the upper part of the sludge waste dehydrating device according to the present invention when two spiral sludge guiders are provided.

FIG. 7 shows that the first dehydrating means has two spiral sludge guiders 14. However in order to increase the amount of sludge waste to be dehydrated as well as the dehydrating velocity of the device, a plurality of, preferably at least two, spiral sludge guiders are arranged on the bottom plate such that they are spaced apart from each other by a predetermined interval and fixed to the shaft disc 15 of the first drive motor $M_1$, and define the same circumferential interval between their outer distal ends.

On the other hand, it is preferred to construct the perforated bottom plate 12 to have a diameter larger than the radius of gyration of the spiral sludge guider 14 or than the outer diameter of the rotary cylindrical wall 18. In this case, the perforated bottom plate 12 is supported by a plurality of support brackets 19 which are mounted on the bottom surface of the upper part 10 and cause this perforated plate 12 to be spaced apart from the bottom surface. In addition, a spring (not shown) is preferably provided under the bottom plate 12 to upwardly bias this bottom plate 12 and to make this plate 12 always come into close contact with the lower end of the spiral sludge guider 14. Of course, this bottom plate 12 may be constructed to have the same area as that of the bottom surface of the upper part cabinet.

In the drawings, each of the spiral sludge guiders is shown as comprising a spiral slender plane plate which comes into close contact with the upper surface of the bottom plate but is rotatable with respect to the stationary bottom plate. However, this spiral sludge guider may have a curved section as a result of bending toward the center of gyration. If desired, this spiral sludge guider may closely have a great number of small apertures (not shown) in the same manner as those of the perforated bottom plate.

Figure 3B:
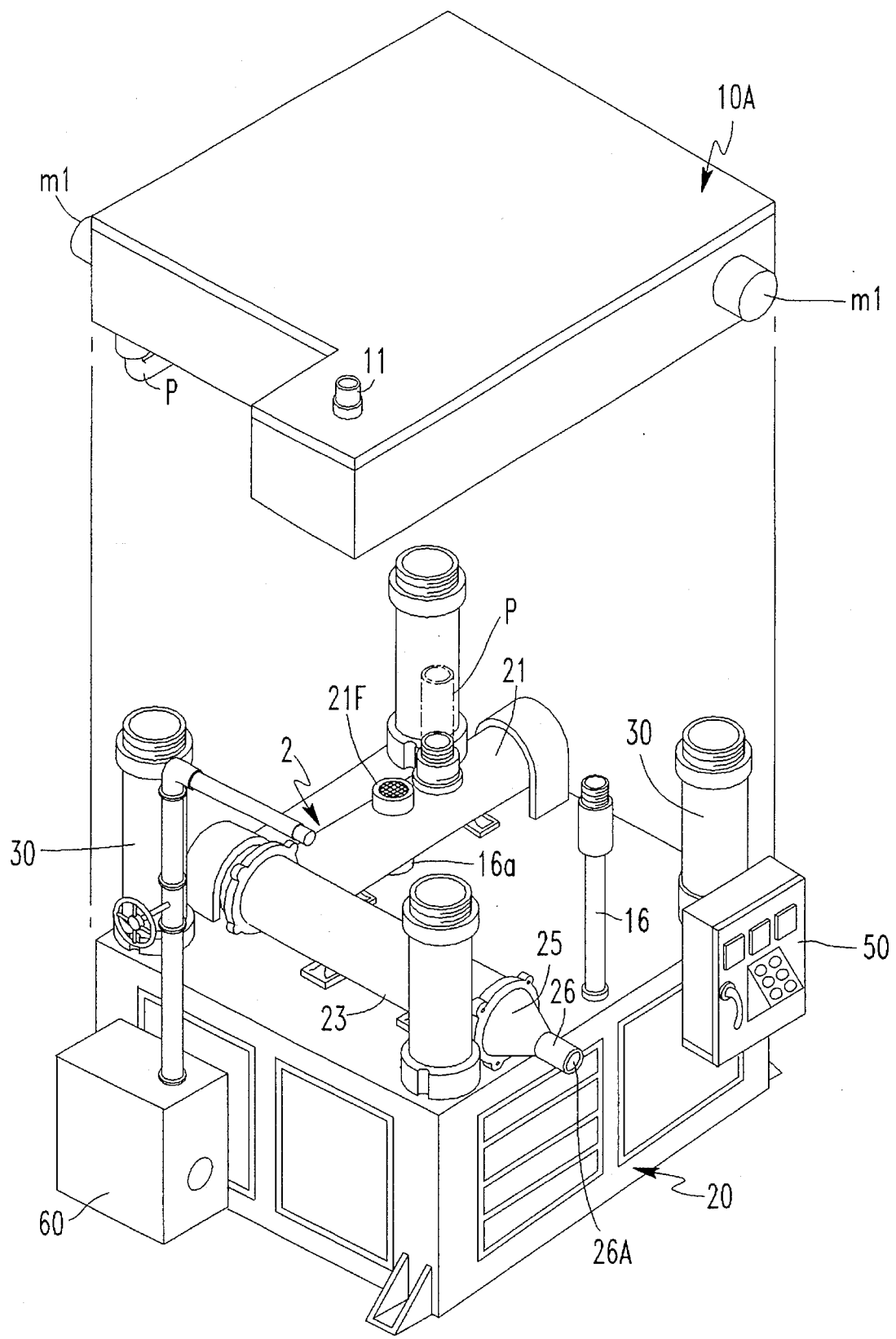
Figure 4D:
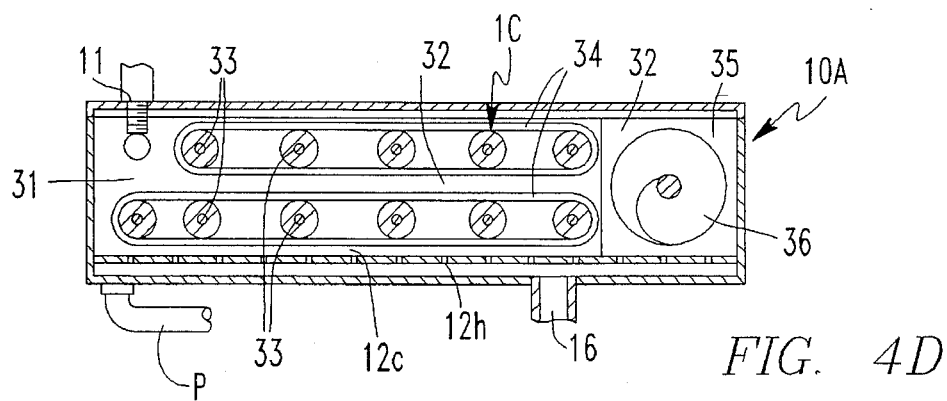
FIG. 4D is a sectional view of the upper part of the embodiment of FIG. 2.
Figure 4E:
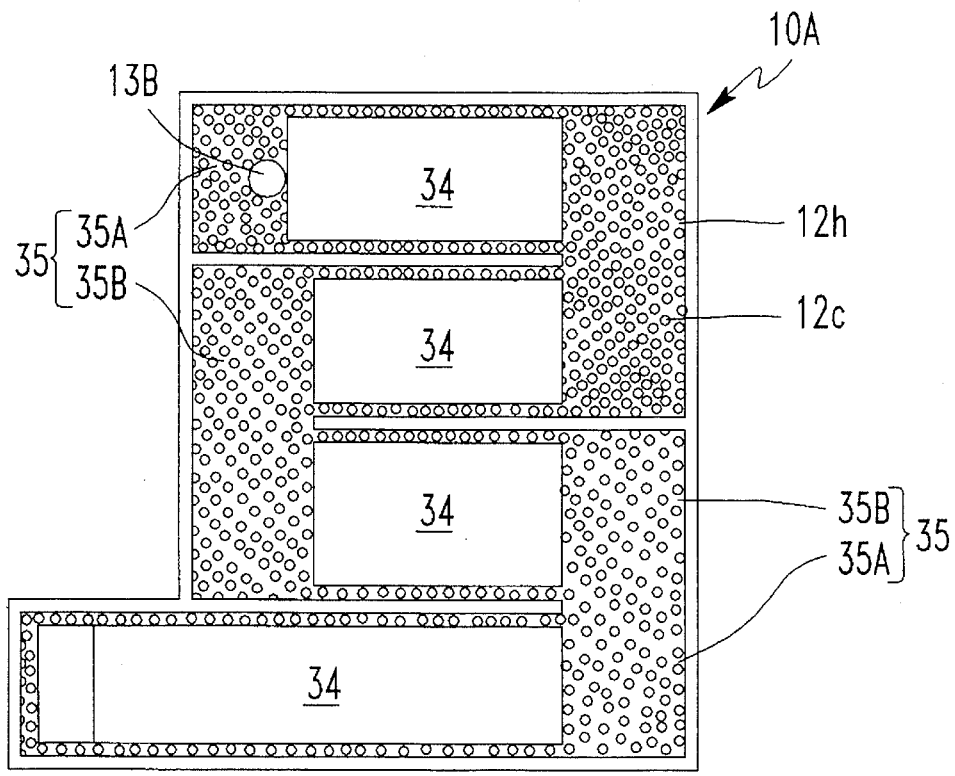
FIG. 4E is a plan view of a cabinet of the upper part of FIG. 4D, showing its lid being removed.

Turning to FIGS. 2, 3B, 4D and 4E, there is shown another embodiment of an upper part according to the present invention. In this embodiment, the upper part 10A includes first dehydrating means 1C having a sludge inlet chamber 31. This chamber 31 is provided with the sludge inlet 11 at its upper part or at its side part. This upper part 10A further includes a pair of partitions 32 which define, in cooperation with a side wall of the chamber 31, a zigzag sludge passage inside the cabinet of the upper part 10A. In this upper part 10A, a pair of upper and lower conveyer belts 34, each having a plurality of compression rollers 33 as best seen in FIG. 4D, is arranged on each partitioned part of the sludge passage to vertically face each other and to be spaced apart from each other by an interval. In this case, the sludge waste to be dehydrated passes between the upper and lower conveyor belts 34 while being compressed. These upper and lower conveyer belts 34 in the zigzag sludge passage are driven in such a manner that they turn in alternately opposite directions such that the sludge waste is fed zigzag through the sludge passage from the sludge inlet chamber 31 to the sludge discharge pipe P. Here, in order to achieve such a zigzag feeding of the sludge waste, the outlet space 35A of a partitioned part of the sludge passage communicates with the inlet space 34B of the neighboring partitioned part of the sludge passage. These spaces 35A and 35B constitute a landing space 35. The upper part 10A has a perforated bottom plate 12c, which has a great number of small apertures 12h and is arranged under the conveyer belts 34 as best seen in FIG. 4E. This first dehydrating means 1C also has the waste water drain 16 connected to the water collection tank 20A of the lower part 20 to drain the waste water to the tank 20A in the same manner as described in the embodiment of FIG. 1.

In this alternate embodiment, the central opening 13B of the bottom plate 12C and the sludge discharge pipe P connected to this opening 13B are arranged at the outlet 35A of the last part of the sludge passage as best seen in FIGS. 4D and 4E. In addition, a screw conveyor 36 is provided in individual landing space 35 such that it is driven by a screw conveyor drive motor m1, which is provided at a side surface of the upper part cabinet, and promotes advance of sludge waste in the landing space 35 from the outlet 35A to the inlet 35B.

Here, two of the screw conveyors 36, which are respectively arranged in the two neighboring landing spaces 35 isolated from each other by the partition 32 and shown at the right side of FIG. 2, are connected to each other through the same rotating shaft and driven by a drive motor $M_1$, thereby simplifying the construction of the upper part 10A.

Figure 3C:
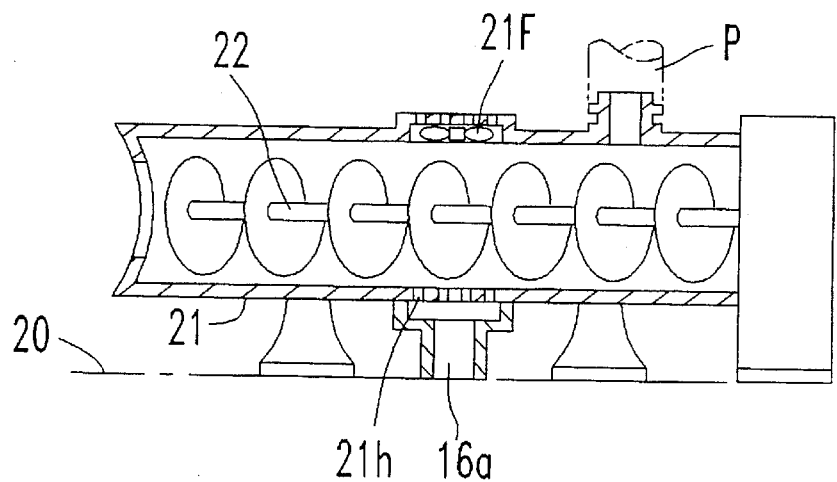

The sludge discharge pipe P, regardless of difference of the embodiments of FIGS. 1, 2 and 3A to 3D, is connected to the second dehydrating means which will be described below. As shown in FIGS. 3A and 3B, this second dehydrating means 2 is provided at its rear side with a first cylindrical case 21 which is connected to the upper part 10 through the pipe P. This first case 21 axially includes therein a first screw conveyor 22 which is driven by the second drive motor $M_2$ of the lower part 20 as shown in FIG. 10. This first case 21 further includes at least one air inlet fan 21F and a plurality of small apertures 21h at its upper part and its lower part, respectively, as best seen in FIG. 3C.

Here, these small apertures 21h are commonly connected to the drain 16a, which in turn penetrates the lower part 20, to drain the waste water from the case 21 to the water collection tank 20A.

Figure 3D:
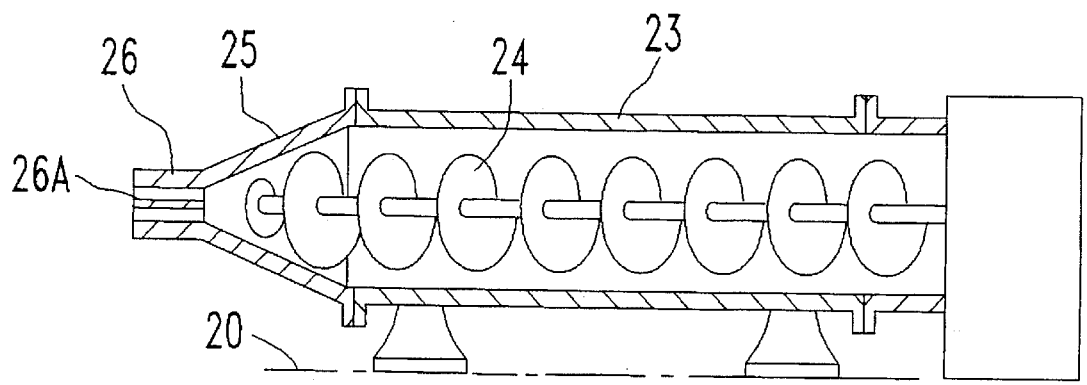

As shown in FIGS. 3A and 3B, the second dehydrating means 2 also includes a second cylindrical case 23 which is arranged on the lower part 20 and connected to the first case 21 as generally crossing with this first case 21. This second case 22 includes, as depicted in FIG. 3D, a second screw conveyor 24 which is axially arranged in that case 22 and driven by the third drive motor $M_3$ of the lower part 20. This second case 23 has a taper front 25, which is provided with a sludge solidifying and discharging port 26 at its distal end. This port 26 is formed on its inner surface with a plurality of axial grooves 26A which are circumferentially spaced apart from each other by a predetermined interval.

Here, the axial grooves 26A may be substituted by axial protrusions without departing from the scope of the present invention.

Figure 6A:
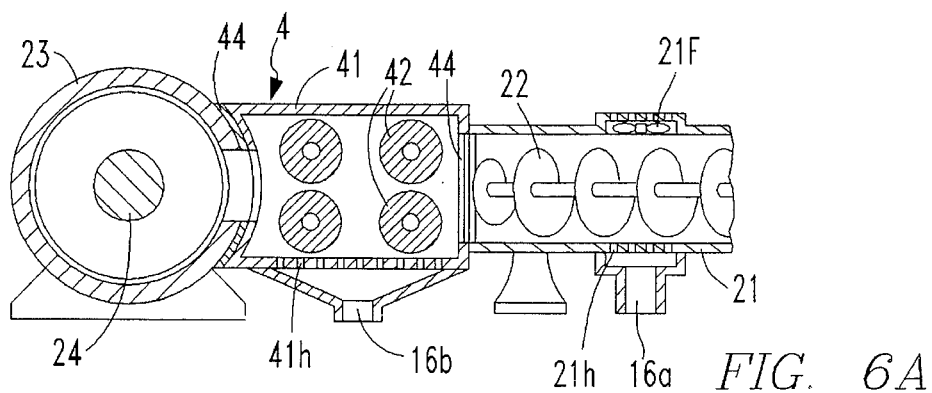

In the present invention, the third dehydrating means 4 may be added to between the first and second cases 21 and 23 in accordance with kinds of sludge wastes to be treated. Referring to FIG. 6A, this third means 4 comprises a box-shaped case 41, or a third case, including therein at least two pairs of upper and lower rollers 42. This third case 41 further includes a pair of vibrators 46, which are mounted on opposite side surfaces or on upper and lower surfaces of the case 41, respectively. In the same manner as the first case 21, this third case 41 is provided with a perforated bottom plate having a plurality of small apertures 41h. These apertures 41h are concentrated to the drain 16b which is in turn piped in the lower part 20 to be connected to the water collection tank 20A. In connecting this third case 41 to both the first and second cases 21 and 23, a vibroisolating packing 44 is tightly interposed between the third case 41 and each of the first and second cases 21 and 23.

Figure 6B:
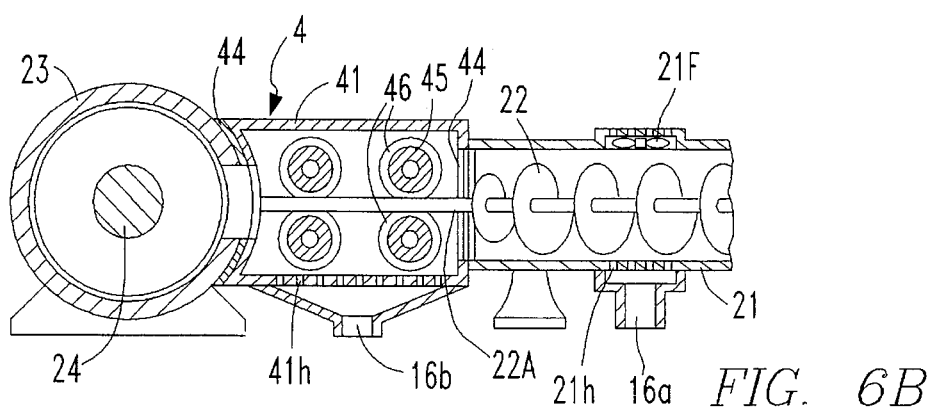
Figure 6C:
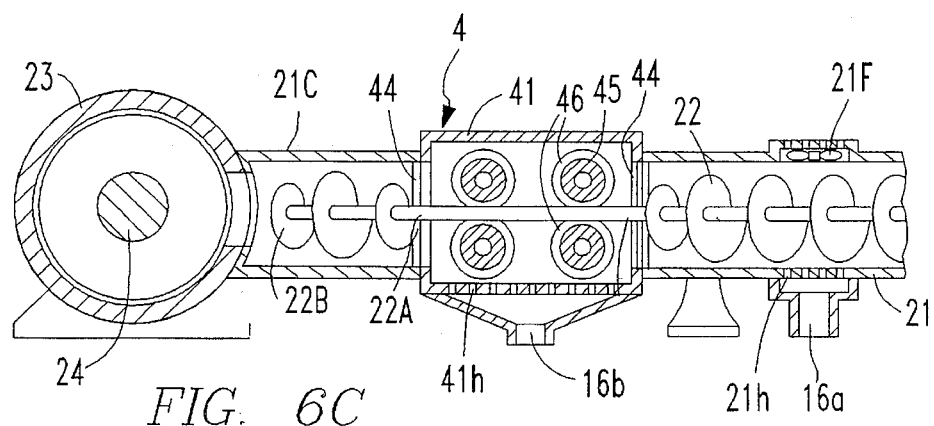
Figures 6D, 6E:
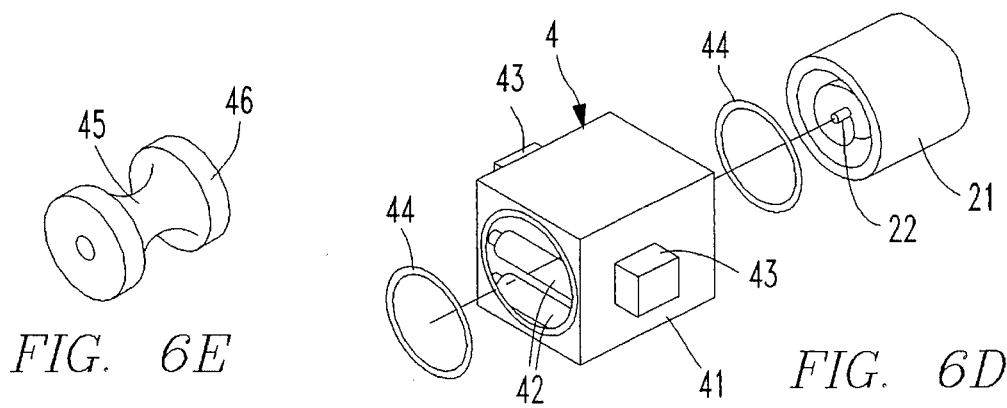

In accordance with another embodiment of the present invention shown in FIG. 6B, each of the upper and lower rollers provided in the third case 41 may comprise a spool roller 46 having an arc-shaped neck 45 as best seen in FIG. 6D. This spool roller 46 allows a rotating shaft 22A, extending from the first screw conveyor 22, to smoothly pass between the upper and lower rollers 46. In the case of provision of these spool rollers 46, an additional screw conveyor 22B shown in FIG. 6C may be provided between the second case 23 and the third case 41 such that it is connected to the rear end of the rotating shaft 22A, axially penetrating the case 41 of the third dehydrating means 4.

When this additional screw conveyor 22B is added, an extension case 21C is preferably provided between the cases 23 and 41 to enclose and protect this conveyor 22B.

This additional conveyor 22B promotes smooth feeding of the sludge waste from the third case 41 of the third dehydrating means 4 to the second case 23 of the second dehydrating means 2. In order to promote the dehydration efficiency of this device, at least two pairs of upper and lower rollers 42 or 46 are arranged in the case 41 with a predetermined interval. In this case, the vibrators 43 may be mounted on the inner walls of the case 41 between the rollers 42 or 46.

The waste waters extruded from the sludge waster as a result of the dehydration of the first to third dehydrating means 1, 2 and 4 are collected by the waste water collection tank 20A of the lower part 20 through the drains 16, 16a and 16b, respectively, as best seen in FIG. 10. The collected waste water is in turn drained from the tank 20A through a drain pipe. In this regard, the present invention simplifies the device construction.

In the drawings, the reference numerals 50 and 60 denote a control box and a sludge feeder, respectively. Here, the sludge feeder 60 may be desirably removed from the device when the sludge inlet 11 is specifically arranged. Otherwise stated, when the sludge inlet 11 is arranged on the upper part of the device, the sludge waste can be fed by employing a hopper (not shown) and this results in requirement of no sludge feeder 60.

In operation of this dehydrating device, the sludge waste is received by the upper part 10 through the sludge inlet 11 to be laid on the perforated bottom plate 12 of the part 10 as depicted in FIGS. 1 and 4A. At this state, the sludge waste is subjected to the first dehydration performed by the first dehydrating means 1. In this first dehydration, the output shaft disc 15 of the motor $M_1$ along with the spiral sludge guider 14, fixed to the shaft disc 15 at its center, rotates upon driving the first drive motor $M_1$ under the control of the control box 50. When the guider 14 is rotated, a part of waste water in the sludge is extruded to be drained through the apertures 12h. Upon rotation, the spiral guider 14 guides the sludge waste to inwardly move from its outermost open inlet part to its center.

In feeding of this sludge waste to the upper part 10, it is preferred to introduce the sludge waste to the space about the radius of gyration of the guider 14.

The sludge waste, moving as guided by the rotating guider 14, is pushed to the inner surface of spiral wall of the guider 14 due to the centrifugal force generated by the rotation of the guider 14. Hence, the waste water is extruded from the sludge and dropped to the bottom wall of the upper part 10 through the apertures 12h of the perforated bottom plate 12.

After this first dehydration, the sludge waste is introduced to the second dehydrating means 2 through the central opening 13 and the pipe P as will be described in detail later herein.

In the case of use of the first dehydrating means 1A according to the second embodiment shown in FIG. 4B where the bottom plate 12A is upwardly inclined from the outside to the center, rotation of the guider 14A guides outward spiral movement of the sludge waste from the outside to the center of the guider 14A simultaneously with pushing the sludge waste to the inner surface of the guider wall due to the centrifugal force. Hence, the waste water is extruded from the sludge waste to drop to the bottom wall of the upper part 10 through the apertures 12h of the bottom plate 12A.

In the case of use of the first dehydrating means 1B according to the third embodiment shown in FIG. 4C where the bottom plate 12B is downwardly inclined from the outside to the center and the sludge waste is received at the center of the guider 14B, rotation of the guider 14B guides inward spiral movement of the sludge waste from the center to the outside of the guider 14B. At the same time of outward movement, the sludge waste is pushed to the inner surface of the guider wall due to the centrifugal force and, as a result, squeezed and dehydrated.

Here, the waste water extruded from the sludge waste is not absorbed by the dehydrated sludge waste thanking for the downward inclination of the bottom plate 12B, but simply flows down toward the center and drops to the bottom surface of the upper part 10 through the apertures 12h of the perforated bottom plate 12B, thereby improving the dehydration efficiency of the first dehydrating means 1B.

In this embodiment having the bottom plate 12B, the dehydrated sludge waste coming out of the guider 14B is compressed between the outermost surface of the spiral guider 14B and the first cylindrical wall 17 to go over the first wall 17 and to heap up on the bottom plate 12B between the first and second walls 17 and 18. At this state, the rotating guide member 18A guides the sludge waste to the opening 13A and causes this waste to be introduced to the second dehydrating means 2 through the sludge discharging pipe P. At this time, the slant roller 14R, preferably mounted on the outermost, surface of the spiral guider 14B as depicted in FIG. 8, comes into contact with the inner surface of the first wall 17 so that it promotes smooth rotation of the guider 14B. This roller 14R also causes the sludge waste to easily go over the first wall 17 and dehydrates the sludge waste itself.

On the other hand, the sludge guider 14, 14A or 14B comprises at least two spiral sludge guiders which are arranged to be spaced apart from each other by the predetermined interval and to define the same circumferential interval between their outer distal ends as depicted in FIG. 7. Such an arrangement of the guiders causes rapid movement of the sludge waste, remarkable increase of the waste amount to be treated and balance maintenance of the rotating spiral guider.

In addition, when the sludge guider has the curved cross section, it efficiently prevents the sludge waste from going over the guider wall due to the rotating centrifugal force. The plurality of the small apertures may be provided throughout the length of this spirals guider and causes centrifugal dehydration of the sludge waste as this waste is pushed to the inner surface of the perforated guider wall due to the centrifugal force during its spiral movement.

The rotation of the sludge guider also makes the sludge remains lodged in the small apertures 12h of the perforated bottom plate be removed and prevents blocking of this bottom plate.

In dehydration of the sludge waste by employing the upper part 10A shown in FIGS. 2, 4D and 4E, the sludge waste delivered from the inlet 11 is heaped up on the inlet part of the sludge inlet chamber 31 and fed to the outlet part of the chamber 31 as loaded between the upper and lower conveyor belts 34 in this chamber 31. Otherwise stated, the rollers 33 of the upper and lower conveyor belts 34 are driven by a drive motor (not shown) to cause these belts 34 turn in opposite directions such that the upper belt turns in counterclockwise direction but the lower belt turns in clockwise direction of FIG. 4D. This opposite directional turning of the conveyor belts 34 feeds, in cooperation with sludge delivery pressure of the sludge inlet 11, the sludge waste at the same time of compressing and squeezing this waste between the belts 34, thereby dehydrating this sludge waste The waste water extruded from the sludge waste drops down to the perforated bottom plate 12C through gaps between opposite sides of the conveyor belts 34 and the inner side surfaces of the cabinet of the upper part 10A. This water is in turn drained to the water collection tank 20A of the lower part 20 through the small apertures 12h of the bottom plate 12C and the drain 16.

When the sludge waste reaches the outlet space 35A of the chamber 31 at last, it is pushed to the inlet space 35B of neighboring passage by the sludge feeding pressure of the chamber 31. This sludge waste is fed from the inlet space 35B to the outlet space 35A of the passage and dehydrated in the same manner as described above. Such a feeding of the sludge waste is repeated in the zigzag sludge passage of the upper part 10A until it reaches the outlet space 35A of the last passage, thereby achieving the zigzag sludge feeding.

When this sludge waste reaches the outlet space 35A of the last passage, it is introduced to the second dehydrating means 2 through the opening 13B of the perforated bottom plate 12C and the sludge discharging pipe P connected to the opening 13B.

In this case, the screw conveyor 36 provided in the landing space 35 promotes advance of the sludge waste from the outlet space 35A to the inlet space 35B.

After accomplishing the first dehydration of the sludge waste by the first dehydrating means of the upper part, the resulting sludge waste is introduced to the second dehydrating means 2 through the sludge discharging pipe P and subjected to the second dehydration process, which will be described hereinbelow.

When the sludge waste discharged from the first dehydrating means 1 through the pipe P is received by the first cylindrical case 21 at the rear upper part of this case 21, this sludge waste is pushed to the front by rotation of the first screw conveyor 22 driven by the second drive motor $M_2$ of the lower part 20. At the same time of frontward pushing of the waste, the rotating conveyor 22 smashes and dehydrates this waste.

During the frontward advance of the sludge waste, the fan 21F introduces the air to the waste to dry it and the waste water is extruded from the sludge waste. This waste water is drained to the water collection tank 20A of the lower part 20 through the small apertures 21h and the drain 16a.

The resulting sludge waste of the first case 21 is in turn introduced to the second cylindrical case 23 and is pushed to the front of the case 23 by rotation of the second screw conveyor 24 driven by the third motor $M_3$ of the lower part 20. When this sludge waste reaches the tapered front 25 of the second case 23, it is highly compressed and discharged from the case 23 through the discharge port 26 as solidified.

When this sludge waste is discharged from the second case 23 through the port 26, it is formed with several axial protrusions at its outer surface corresponding to the axial grooves 26A of the discharge port 26. These axial protrusions facilitate heaping up of the resulting solid waste and increase air contact surface of the waste to cause rapid drying thereof.

Figure 9:
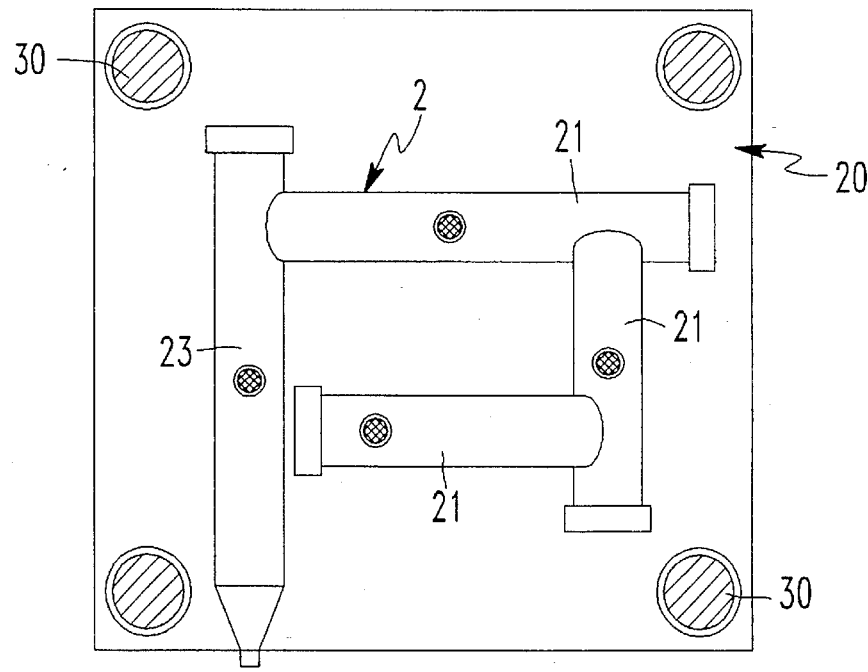
FIG. 9 is a plan view showing an arrangement of four cylindrical cases of the second dehydrating means according to an embodiment of the present invention.

Hereinbefore, It has been described that the dehydrating device of this invention has two cylindrical cases respectively constituting the first and second cases 21 and 23. However, this dehydrating device may have at least two cylindrical cases 21. Particularly from the viewpoint of the recent trend of compact of the device, it is preferred to arrange four cylindrical cases, comprising three first cases 21 and a second case 23, on the lower part 20 such that they define rectangular spiral profile within permission of upper surface area of the lower part 20 as depicted in FIG. 9.

In application of the third dehydrating means 4, which is selectively interposed between the first and second cases 21 and 23 in line with kinds of the sludge wastes to be treated, the sludge waste delivered from the first case 21 is introduced to the box-shaped case 41 of the third means 4. In this case 41, the waste is compressed and dehydrated by the rollers 42. At this time, the vibrators 43 vibrates the case 41 and improves the dehydration efficiency of this third means 4. The vibration of the case 41 is prevented from being transmitted to and bad influencing the other elements including the first and second cases 21 and 23 thanking for the vibroisolating packings 44 provided between the cases 21, 23 and 41.

When the shaft 22A extending from the first screw conveyor 22 passes between the spool rollers 46, each provided with the arc neck 45, as depicted in FIG. 6B, the compression surface of each of the rollers 46 increases and this provides improved dehydrating effect which has been anticipated by conventional rollers of larger compression surface. When this shaft 22A extends to the additional screw conveyor 22B enclosed by the extension case 21C between the cases 23 and 41 as depicted in FIG. 6C, the sludge waste delivered from the third case 41 is additionally compressed to be easily fed to the second case 23.

In dehydration of the sludge waste by the third means 4, the sludge waste introduced between the upper and lower rollers 42 and 46 is compressed by the rollers 42 and 46, which rotate at a speed higher than the sludge inlet speed, at the same time of advancing to the front of the means 4. In this regard, once squeezed by the rollers 42 and 46, the sludge waste is fed under the condition that it is isolated from the sludge waste having relatively higher moisture content in the first case 21, thereby preventing this dehydrated sludge waste of the third case 41 from absorbing moisture of the higher moisture content sludge waste in the first case 21.

The waste water extruded from the sludge waste in this third dehydrating means 4 is drained to the water collection tank 20A through the small apertures 41h and the drain 16b. Here, it is preferred to provide a filter for each of the drains 16, 16a and 16b to filter said waste water.

The resulting sludge waste of this third dehydrating means 4 is, thereafter, introduced to the second case 23 of the second dehydrating means 2 of which dehydration process was described above.

As aforementioned, the present invention provides a sludge waste dehydrating device which has a good compatibility by selectively mounting one of several types of upper parts on a lower part in accordance with kinds of sludge wastes to be treated. This device has a compact size and a simple construction, thereby providing an excellent operational energy efficiency, simplifying the installation process and reducing the manufacturing cost. This device shows relatively much amount of sludge waste treatment in spite of its compact size and experimentally exhibits a good dehydration efficiency such that the resulting sludge waste has a moisture content of about 40%. Furthermore, this moisture content can be reduced to about 30% which is regarded as a very excellent result in comparison with the conventional result of about 60–80%. Another advantage of the present invention is resided in that the dehydrating device remarkably reduces the installation cost of the waste treatment system and can be applied to a small scale factory as well as a large scale waste treatment plant.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A device for dehydrating sludge waste comprising; a lower part; a replaceable upper part having a sludge inlet, said upper part being detachably mounted to said lower part and to be spaced apart upwardly from the lower part;

a plurality of columns being provided between upper and lower parts for detachably mounting said upper part on said lower part, first sludge dehydrating means for performing a first dehydration of the sludge waste with said first means being provided in said upper part;

second sludge dehydrating means for performing a second dehydration of the sludge waste said second means being mounted on said lower part and communicating with said first means through a pipe, and comprising first and second cases being connected to each other;

third sludge dehydrating means;

said first case of the second sludge dehydrating means being communicated with said first sludge dehydrating means through a sludge discharging pipe;

a first screw conveyor being provided in said first case being driven by a first drive motor and provided in said lower part;

said first case being provided with at least two cylindrical cases being crossed and communicated with each other, and said second case of the second sludge dehydrating means crosses with said first case to communicate with said first case;

a second screw conveyor being processed in said second case and being driven by a second motor provided to said lower part;

a taper front being provided, at distal end, with a sludge solidifying and discharging port, a plurality of drains for draining waste waters extruded from said sludge waste as a result of sludge dehydration to a water collection tank;

a plurality of apertures for draining the waste water to said water collection tank through said drains;

said sludge solidifying and discharging port being provided with a plurality of axial protrusions preparing means for providing a plurality of axial protrusion on the outer surface of the resulting sludge waste, said axial protrusions preparing means being provided on the outer surface of said port such that they are circumferentially spaced apart from each other.

2. A device for dehydrating sludge waste according to claim 1, wherein said first sludge dehydrating means comprises:

a stationary perforated bottom plate being mounted on a bottom surface of said upper part to be spaced from said bottom surface, said bottom plate having a plurality of apertures for draining the waste water to said bottom surface and a sludge discharging opening for discharging the sludge waste after the first dehydration to said second sludge dehydrating means;

rotatable spiral sludge guide means disposed on said bottom plate such that it comes into contact with said bottom plate and is rotated with respect to said bottom plate; and a third drive motor for driving said sludge guide means, said drive motor having an output shaft disc being fixed to the center of said sludge guide means.

3. A device for dehydrating sludge waste according to claim 2, wherein said bottom plate is upwardly inclined from the outside to the center and said sludge guide means is upwardly inclined so as to correspond to the inclined bottom plate.

4. A device for dehydrating sludge waste according to claim 2, wherein said bottom plate is upwardly inclined from the center to the outside, said sludge guide means is upwardly inclined so as to correspond to the inclined bottom plate, and said first sludge dehydrating means further comprises:

a first cylindrical wall, said first wall having an inner diameter larger than the radius of gyration of said spiral sludge guide means and a height lower than that of said sludge guide means, and being mounted on said bottom plate to surround said sludge guide means;

a rotary cylindrical wall surrounding said first cylindrical wall, said rotary cylindrical wall having a height higher than that of said sludge guide means; and a guide member being provided at a position inside of said rotary cylindrical wall, and said sludge discharging opening is positioned on said bottom plate between said first cylindrical wall and said rotary cylindrical wall.

5. A device for dehydrating sludge waste according to claim 4, further comprising a slant roller being mounted on an outer distal end of said spiral sludge guide means to come into contact with an inner surface of said first cylindrical wall.

6. A device for dehydrating sludge waste according to any one of claims 2 to 4, wherein said sludge guide means comprises at least two spiral sludge guiders, said sludge guiders being arranged to be spaced apart from each other by an interval and to be fixed to said output shaft disc of the first drive motor, and to define a circumferential interval between their outer distal ends.

7. A device for dehydrating sludge waste according to any one of claims 2 to 4, wherein said spiral sludge guide means has a curved section resulting from bending toward the center of gyration thereof.

8. A device for dehydrating sludge waste according to claim 7, the wall of said spiral sludge guide means has a plurality of apertures in its bottom plate for promoting the first dehydration of the sludge waste.

9. A device for dehydrating sludge waste according to claim 1, wherein said upper part comprises:

a sludge inlet chamber being provided with the sludge inlet; and a plurality of partitions defining a zigzag sludge passage in said upper part, said sludge passage being provided with a sludge discharging opening at a sludge outlet space, said sludge discharging opening is connected to a pipe which is in turn connected to said first case of the second sludge dehydrating means, and said first dehydrating means comprises:

a pair of upper and lower conveyor belts being provided in each of partitioned parts of said zigzag sludge passage, each of said conveyor belts being supported and driven by a plurality of compression rollers, and said pair of upper and lower conveyor belts defining a sludge inlet space and a sludge outlet space at opposite sides thereof and facing each other with an interval, and being driven in opposite directions; and a perforated bottom plate having a plurality of small apertures and being connected to one of said drains, said bottom plate being positioned under said lower conveyor belts.

10. A device for dehydrating sludge waste according to claim 9, further comprising a screw conveyor for promoting sludge feeding in a landing space comprising one of said sludge inlet space and neighboring sludge outlet space, said screw conveyor being provided in said landing space longitudinally.

11. A device for dehydrating sludge waste according to claim 1, wherein said third sludge dehydrating means performs an additional dehydration of the sludge waste to be fed to said second case of the second sludge dehydrating means, said third means being interposed between said first and second cases of the second dehydrating means.

12. A device for dehydrating sludge waste according to claim 11, wherein said third sludge dehydrating means comprises:

a third case being connected between said first and second cases of the second sludge dehydrating means with a pair of vibroisolating packings, each of said packings being interposed between said third case and each of the first and second cases;

at least two pairs of upper and lower rollers being provided in said third case for compressing the sludge waste, said upper and lower rollers being driven at a rolling speed higher than a sludge inlet speed of said third case;

a perforated bottom plate being provided under said rollers, said bottom plate having a plurality of apertures being connected to one of said drains and in turn connected to said water collection tank; and a pair of vibrators being mounted on said third case for vibrating this third case.

13. A device for dehydrating sludge waste according to claim 12, wherein said each of said upper and lower rollers comprises a spool roller having an arc-shaped neck for allowing a rotating shaft extending from the first screw conveyor of said first case of the second sludge dehydrating means to pass between the upper and lower rollers.

14. A device for dehydrating sludge waste according to claim 13, further comprising:

an additional screw conveyor being connected to a distal end of said rotating shaft passing through the rollers; and an extension case being provided between said second and third cases to cover said additional screw conveyor.

* * * * *